United States Patent Office 3,278,523
Patented Oct. 11, 1966

3,278,523
PROCESS FOR PREPARING β-LACTAM DERIVATIVES
Hans Biener, Kelkheim, Taunus, and Konrad Albrecht, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 6, 1965, Ser. No. 446,099
Claims priority, application Germany, Apr. 8, 1964, F 42,552
6 Claims. (Cl. 260—239)

German Patents 941,847 and 1,119,277 describes a process for the addition of N-carbonyl-sulfamidic chloride to olefins, whereby in general β-lactam-N-sulfochlorides and unsaturated carboxylic acid-N-sulfochlorides are formed simultaneously. As a rule, the lactam-N-sulfochlorides are the main reaction products. Since they can easily be saponified to free β-lactams, this process is an elegant method for preparing substituted β-lactams in good yields.

However, as may be seen from Patents 1,119,227 and 1,112,063, the described process does not provide adequate yields with all olefins. According to the state of the art, only aromatically substituted ethylenes, for example styrene, and the olefins of the isobutylene type which are dialkyl-substituted at at least one olefinic carbon atom, or even tri- and tetramethylethylene and their homologues, can be reacted smoothly with N-carbonyl-sulfamidic chloride. Heretofore, reaction α-olefins, such as propylene or butene-(1), with N-carbonyl-sulfamidic chloride, involved considerable decomposition of the reaction products and produced only small yields. The process for separating mixtures of olefins, described in German Patent 1,112,063, is based on this behaviour in the reaction.

Whereas the reaction of N-carbonyl-sulfamidic chloride with olefins of the general formula

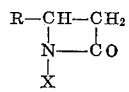

(I)

in which $R_1$ and $R_2$ represent hydrocarbon radicals or $R_1$ may stand for a hydrogen atom if $R_2$ is bound by an aromatic carbon atom to the carbon atom bearing the olefinic double bond, and $R_3$ and $R_4$ each represent hydrogen atoms or hydrocarbon radicals which are bound by an aliphatic carbon atom to the olefinic carbon atom, is radially completed within a short time at a moderate temperature, the straight-chain α-olefins under the same conditions react only very slowly or not at all. Therefore, straight-chain α-olefins such as propylene or butene-(1) could hitherto be reacted with N-carbonyl-sulfamidic chloride only at a high temperature and with very long reaction periods. Such severe reaction conditions, however, cause decomposition of the primarily formed reaction products. If the reaction of straight-chain α-olefins with N-carbonyl-sulfamidic chloride is carried out in the presence of inert, non-polar organic diluents in order to prevent the decomposition of the reaction products, the reaction is further slowed down and in many cases a reaction does not take place at all.

Owing to the pronounced instability of the reaction products and also for reasons of economy, it is not possible to extend the reaction times at will, because the reaction mixtures turn black and then give only poor results.

Now, we have found that β-lactam derivatives of the general formula

in which R represents an alkyl group having 1 to 16 carbon atoms and X represents the group —$SO_2Cl$ or a hydrogen atom, can be prepared by reacting α-olefins of the general formula R—CH=$CH_2$, in which R has the meaning given above, with N-carbonyl-sulfamidic chloride (OCN—$SO_2Cl$) in the presence of an excess of the α-olefin, and, if desired, hydrolyzing in known manner the β-lactam-N-sulfochlorides obtained.

The reaction according to the present invention of N-carbonyl-sulfamidic chloride with straight-chain α-olefins, used in stoichiometrical excess, takes place, surprisingly without decomposition of the reaction products and under slight discoloration of the reaction mixtures. The corresponding β-lactam-N-sulfochlorides are obtained in yields and with a purity which has been hitherto attained only with the above-mentioned olefins of the general formula I. The fact that by applying an excess of olefin the reaction speed, the yields and the purity are considerably improved, is the more surprising as reaction products with undetermined constitution and small quantities of β-lactom-N-sulfochlorides are obtained when N-carbonyl-sulfamidic chloride is used in excess.

The reaction can also be carried out in the presence of a polar solvent which accelerates the reaction but does not react with N-carbonyl-sulfamidic chloride. As such solvents there may be used, for example, acetonitrile, nitromethane and liquid sulfur dioxide.

As starting compounds, there may be used in the process of the invention all straight-chain α-olefins with 3 to 18 carbon atoms. The lower olefins, such as propylene and n-butene-(1), which are in the gaseous state under normal conditions, are advantageously reacted under pressure with N-carbonyl-sulfamidic chloride, whereas the higher boiling homologeous such as pentene-(1), hexene-(1), dodecene-(1) and octadecene-(1) are usually reacted under normal pressure.

The reaction of N-carbonyl-sulfamidic chloride and the α-olefins is suitably carried out at a temperature in the range of 10° and 120° C., preferably 25° and 60° C.

The α-olefins are used in a quantity of about 1.5 mol to 20 mols per mol of N-carbonyl-sulfamidic chloride, a 2- to 8-fold molar excess being particularly advantageous. When the reaction is carried out in the presence of a polar solvent which accelerates the reaction, a smaller excess e.g., a molar excess as low as about 1.2:1, of olefin may also be sufficient.

When the reaction is completed, the excess olefin and, if used, the polar solvent are removed by distillation or by passing a stream of gas, for example, nitrogen, through the reaction mixture. The higher boiling olefins and solvents are advantageously removed by distillation under reduced pressure in order to preserve the very sensitive β-lactam-N-sulfochlorides. The β-lactam-N-sulfochlorides mono-substituted in 4-position are usually obtained in the form of viscous oils which are relatively pure and have only a low tendency to crystallize.

The β-lactam-N-sulfochlorides can be converted in known manner by hydrolysis into free β-lactams. This may be carried out by stirring the β-lactam-N-sulfochlorides into water, if desired in the presence of agents imparting solubility, within a pH-range of from about 2 to 9, while simultaneously neutralizing the acid liberated (German Patent 1,116,228).

The isolation of the β-lactams formed can be carried out by extraction with suitable solvents, for example, with chloroform. After removal of the solvent by distillation, the β-lactams can be purified by distillation under reduced pressure. β-Lactams which are solid at room temperature can be purified by recrystallization.

Owing to their versatile reactivity, the β-lactam-N-sulfochlorides obtained according to the present invention are technically valuable intermediate products. The β-lactams monoalkyl-substituted in 4-position prepared therefrom can be easily polymerised and yield then valuable polymers which can be shaped, for example, to fibers or foils.

The following examples illustrate the invention but they are not intended to limit it thereto:

*Example 1*

283 g. (2 mols) of N-carbonyl-sulfamidic chloride are stirred vigorously, at a temperature of 45–50° C., with 252 g. (6 mols) of propylene in an autoclave, until a sample of the mixture upon contact with water does no longer generate carbon dioxide. The progress of the reaction can be followed by measuring the quantity of carbon dioxide generated with water. Directly after completion of the reaction, for which about 20 to 30 minutes are required, the pressure is released. 1-chlorosulfonyl-4-methyl-azetidinone-(2) is obtained in the form of a yellow viscous liquid which is stable for a short time only. Upon prolonged cooling to −10° C., the sulfochloride crystallizes. After repeated recrystallization from diisopropyl ether, it is relatively well stable. Yield: 225 g.

For characterizing the β-lactam-sulfochloride obtained, there may be used, in addition to the hydrolysis to the free β-lactam described below, also the reaction to the anilide of 3-(amino-N-sulfanilido)-butyric acid. For this purpose, a sample of 1-chlorosulfonyl-4-methyl-azetidinone-(2) is diluted with the trifold quantity by volume of methylene chloride and combined, while cooling and stirring, with the same quantity by weight of aniline. Upon stirring with the same quantity by volume of 2N sodium carbonate solution, the anilide precipitates. It is filtered off with suction, washed with a 2N sodium carbonate solution and recrystallized from a mixture of methanol and water. Colorless prisms melting at 158° C. are obtained.

*Analysis.*—Calc.: N=12.60% S=9.61%. Found: N=12.7%; S=9.9%.

The β-lactam-N-sulfochloride can be hydrolysed to the free β-lactam in the following manner:

The reaction product and 6N sodium hydroxide solution are added dropwise, while stirring, at 40°–50° C., to about 200 ml. of water in such a manner that a pH-value of 2–7 is maintained. As soon as hydrolysis is complete, the pH-value of the reaction mixture is adjusted to 7 and the free lactam is extracted with chloroform. After separation of the organic phase and removal of the chloroform by distillation, the β-lactam that remains behind is distilled under reduced pressure. 102 g. of 4-methyl-azetidinone-(2) in the form of a colorless oil having a boiling point of 52° C./0.2 mm. Hg are obtained.

*Analysis.*—Calc.: C=56.40%; H=8.30%; N=16.44%. Found: C=56.7%; H=8.3%; N=16.4%.

*Example 2*

283 g. (2 mols) of N-carbonyl-sulfamidic chloride, 130 g. (3.1 mols) of propylene and 320 ml. of liquid sulfur dioxide are stirred for about 15 to 20 hours at 30° C. in a glass autoclave, which has been cooled with Dry Ice for the filling and into which the components have been weighed-in in liquid state. The completion of the reaction can be seen from the attenuation of the violence with which a sample of the reaction mixture reacts with water. After having released the pressure, the mixture is suitably stirred for a short time under reduced pressure to remove any residues of sulfur dioxide.

For characterizing the sulfochloride obtained, the ethyl ester of 3-aminobutyric acid can be prepared as follows: a sample of the β-lactam-N-sulfochloride is added dropwise to the 1.2-fold molar quantity of a solution of sodium in alcohol. The reaction solution is then saturated, without cooling, with gaseous hydrogen chloride, boiled for 2 hours under reflux, the alcohol is removed to a large extent by distillation and the residue is dissolved in as small a quantity of water as possible. After removal of any neutral components by extraction with ether, the mixture is rendered strongly alkaline by means of concentrated sodium hydroxide solution, extracted with methylene chloride and after evaporation of the solvent the amino-acid ester is distilled under reduced pressure. Boiling point 63° C./14 mm. Hg $n_D^{25}$=1.4205.

*Analysis.*—Calc.: C=54.93%; H=9.99%; N=10.67%. Found: C=55.2%; H=10.2%; N=10.7%.

The 1-chlorosulfonyl-4-methyl-azetidinone-(2) obtained as described above can be hydrolysed to the free β-lactam in the manner described in Example 1. By this method 95–98 g. of 4-methyl-azetidinone-(2) are obtained; the compound is identical with the compound described in Example 1.

*Example 3*

A mixture of 283 g. (2 mols) of N-carbonyl-sulfamidic chloride and 340 g. (6 mols) of butene-(1) is stirred for about 20 to 25 hours, at 40° C., in an autoclave, until a sample of the reaction solution upon addition of water no longer generates carbon dioxide. After evaporation of the olefin which must not be complete, the 1-chlorosulfonyl-4-ethyl-azetidinone-(2) remaining behind in the form of viscous oil is suitably further treated without delay.

The sulfochloride can be hydrolysed in the manner described in Example 1 to form 4-ethyl-azetidinone-(2) which is extracted with chloroform and purified by distillation. 92 g. of 4-ethyl-azetidinone-(2) having a boiling point of 53° C./0.1 mm. Hg, are obtained.

*Analysis.*—Calc.: C=60.50%; H=9.15%; N=14.13%. Found: C=60.5%; H=9.2%; N=14.1%.

*Example 4*

283 g. (2 mols) of N-carbonyl-sulfamidic chloride, 150 g. (2.7 mols) of butene-(1) and 300 ml. of liquid sulfur dioxide are stirred for about 16 hours at 25° C. in an autoclave, until a sample of the reaction mixture, which has been freed from $SO_2$ under reduced pressure, upon contact with water does not show evolution of carbon dioxide. After having released the pressure, 1-chlorosulfonyl-4-ethyl-azetidinone-(2) is obtained in the form of a yellow brown oil.

Before hydrolysis to the lactam, the sulfochloride is stirred for a short period under reduced pressure to remove residual sulfur dioxide, because the disturbing concentration of salts in the solution is then not so high. Upon hydrolysis of the sulfochloride in the manner indicated in Example 1, 95 g. of 4-ethyl-azetidinone-(2) having a boiling point of 53° C./0.1 mm. Hg, are obtained.

*Example 5*

A mixture of 142 g. (1 mol) of N-carbonyl-sulfamidic chloride, 250 g. (1.5 mol) of dodecene-(1) and 250 ml. of liquid sulfur dioxide is heated in an autoclave, while stirring, for 4 hours at 40° C. and then for about 12 hours at 30° to 35° C. until a sample of the reaction solution upon addition of water does not show any reaction on N-carbonyl-sulfamidic chloride. Owing to the relatively high boiling point of the olefin, excess dodecene-(1) and dissolved sulfur dioxide can be removed quantitatively by distillation under reduced pressure only with partial decomposition of the 1-chlorosulfonyl-4-decyl-azetidinone-(2) formed.

These substances, however, do not disturb the hydrolysis to the free lactam according to Example 1, which yields 36 g. of 4-decyl-azetidinone-(2) having a boiling point of 130° C./0.05 mm. Hg and which solidifies in the reaction vessel.

The purification of the crude lactam can also be carried out by recrystallization of the crude product, which has been extracted with chloroform, from diisopropyl ether, whereby colorless leaflets melting at 52°–53° C. are obtained.

*Analysis.*—Calc.: C=73.85%; H=11.93%; N=6.63%. Found: C=74.2%; H=12.0%; N=6.7%.

We claim:

1. A process for preparing a β-lactam derivative of the formula

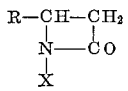

in which R represents alkyl containing 1 to 16 carbon atoms and X represents —$SO_2Cl$ or hydrogen, which comprises reacting an α-olefin of the formula R—CH=$CH_2$ in which R has the meaning defined above, with N-carbonyl-sulfamidic chloride in the presence of at least a 1.2:1 molar excess of the α-olefin at a temperature between 10° and 120° C. in the presence of an inert solvent selected from the group consisting of acetonitrile, nitromethane and liquid sulfur dioxide.

2. A process as defined in claim 1, wherein the β-lactam-N-sulfochloride obtained is isolated and treated with an aqueous medium at a pH between about 2 and 9.

3. A process as claimed in claim 1, wherein the reaction of the α-olefin with N-carbonyl-sulfamidic chloride is carried out at a temperature between 25° and 60° C.

4. A process as claimed in claim 1, wherein 1.2 to 20 mols of the α-olefin is used per mol of N-carbonyl-sulfamidic chloride.

5. A process as claimed in claim 1, wherein 2 to 8 mols of the α-olefin is used per mol of N-carbonyl-sulfamidic chloride.

6. A process for preparing a β-lactam derivative of the formula

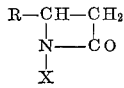

in which R represents alkyl containing 1 to 16 carbon atoms and X represents —$SO_2Cl$ or hydrogen, which comprises reacting an α-olefin of the formula R—CH=$CH_2$ in which R has the meaning defined above, with N-carbonyl-sulfamidic chloride in the presence of at least a 1.5:1 molar excess of the α-olefin at a temperature between 10° and 120° C.

References Cited by the Examiner

FOREIGN PATENTS 941,847   4/1956   Germany.

ALEX MAZEL, *Primary Examiner.*

NICHOLAS S. RIZZO, *Examiner.*

ALTON D. ROLLINS, *Assistant Examiner.*